Sept. 30, 1958 W. C. ANDERSON ET AL 2,853,878
FLUID LEVEL-MEASURING SYSTEM
Filed Aug. 26, 1955
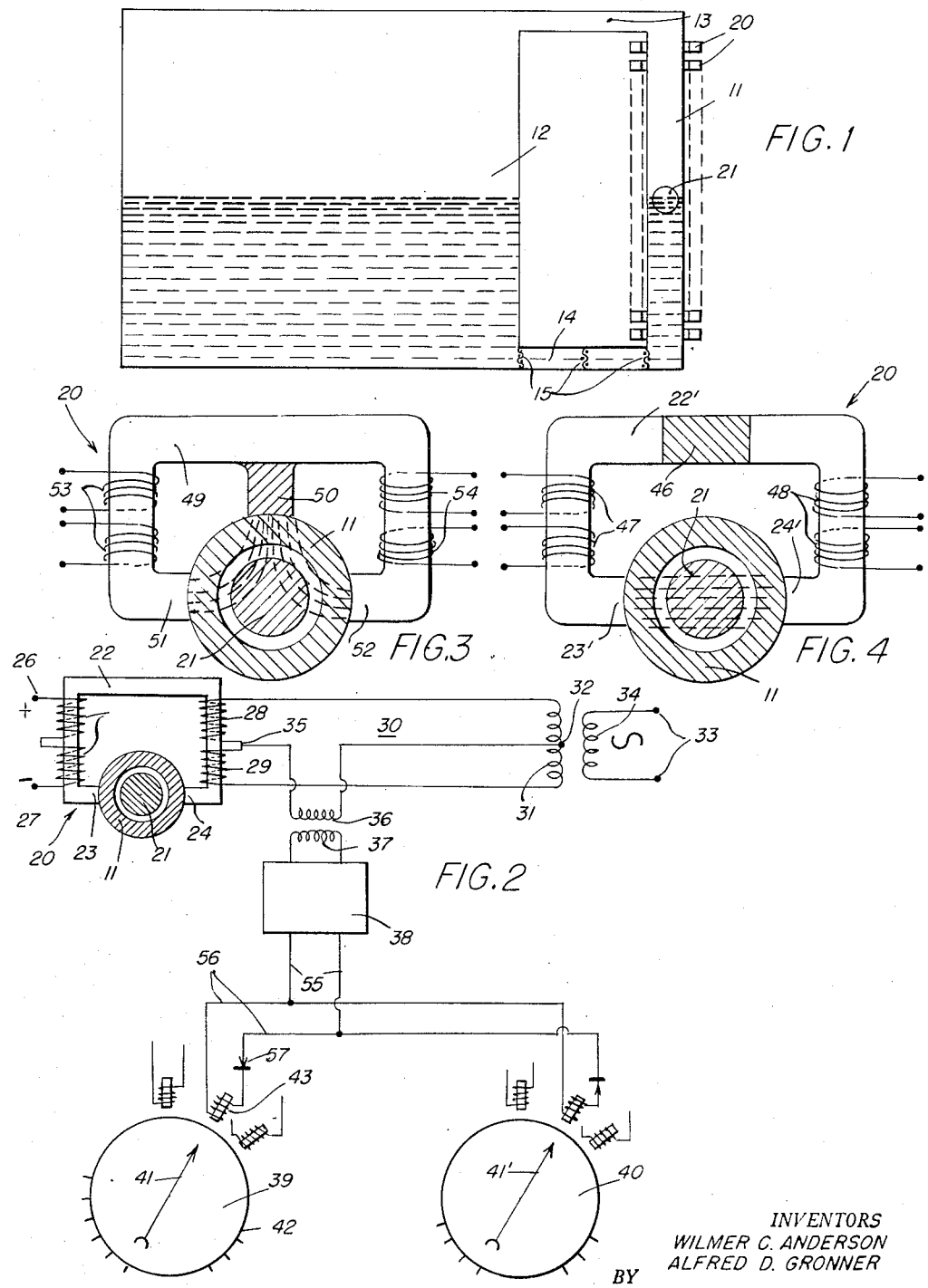
INVENTORS
WILMER C. ANDERSON
ALFRED D. GRONNER
BY
R.J. Dearborn
ATTORNEY

United States Patent Office 2,853,878
Patented Sept. 30, 1958

2,853,878
FLUID LEVEL-MEASURING SYSTEM

Wilmer C. Anderson, Greenwich, Conn., and Alfred D. Gronner, White Plains, N. Y., assignors to The Liquidometer Corporation, Long Island City, N. Y., a corporation of Delaware Application August 26, 1955, Serial No. 530,796

8 Claims. (Cl. 73—313)

This invention is concerned with a liquid level measuring system. More specifically, the system according to this invention may be employed for use with high pressure boilers such that the ordinary gage glass is structurally not feasible.

The system of this invention employs a welded standpipe which may be constructed of any sufficiently high strength material that will withstand the high temperatures and pressures involved in a high pressure boiler. The only restriction required is that such standpipe shall be a non-magnetic material, e. g. stainless steel having non-magnetic properties. The invention contemplates the use of a floating ball that is buoyed up by the boiler fluid, located within the standpipe. This ball must be at least partially constructed of magnetic material having relatively high permeability. Then, in order to determine the position of the floating ball within the standpipe there are a series of vertically spaced magnetometer elements which will magnetically detect the presence of the ball adjacent each such magnetometer. By this arrangement a step-by-step indication may be had for the level of the fluid within the boiler.

Among the advantages which are gained by employing such a system are the following: There is no violation of a continuous welded construction for the high pressure boiler including its standpipe and the required openings, so that maximum pressures may be employed. There are no moving parts within the main tank enclosure of the boiler so that there is nothing to break down in this space which would necessitate a cutting open of the boiler for repairs. The only moving element of the system is a free-floating ball located in the separate standpipe enclosure so that a very reliable and simple mechanism is involved. There are no electrical circuits or components for such circuits located within the tank so that no special structural provisions are necessary; and again, nothing within the boiler tank enclosure is subject to break down, which might involve expensive repair operations. Thus there is nothing to wear out inside or adjacent to the unitary sealed boiler structure. The indication which is had is digital in nature which provides a source of reliability since failure of any one detection element does not affect the indication of fluid level at any of the remaining elements. Furthermore, the accuracy of indication may be as great as desired, since the number of elements for detecting position of the floating ball may be made as great as is wished within practical limits. The system is not adversely affected in any manner by bubbles on the walls of the standpipe or, of course, on the main tank of the boiler. The electrical circuitry involved is simple and reliable in nature; and finally there is no temperature compensation required for the fluid-level indications.

Consequently, it is an object of the invention to provide a fluid level-measuring system which provides the above stated advantages.

Another object of the invention is the provision of a system that includes no moving parts except for a float carried on the surface of a column of fluid.

Another object of the invention is to provide a system involving the use of a magnetic material float including a series of vertically-spaced magnetometers to detect the position of the float in a step-by-step manner.

Briefly, the invention includes a fluid level-measuring system for use with a high pressure boiler, the system comprising an upright tube of non-magnetic material having its extremities connected to said boiler at the maximum and minimum levels of boiler fluid that are to be measured. The system further comprises a magnetically permeable body located within the tube and floating on said fluid. In addition, the system comprises a series of electromagnetic elements vertically spaced apart and located adjacent the surface of said tube. Finally, the system comprises means for determining the presence of the floating body when it is located adjacent to individual ones of said electromagnetic elements.

Certain embodiments of the invention are described below as illustration of examples of ways of carrying out the invention. These embodiments are also illustrated in the drawings, in which:

Fig. 1 is a schematic view illustrating a high pressure boiler and having a standpipe connected thereto;

Fig. 2 is a circuit diagram illustrating an electrical system embodying one type of a magnetometer for detecting the presence of the floating ball in the standpipe;

Fig. 3 is an enlarged schematic illustrating one type of magnetic material circuit for use with one of the magnetometers; and Fig. 4 is also an enlarged schematic illustrating another type of magnetic material circuit element for use with one of the magnetometers.

Fig. 1 illustrates the manner in which a standpipe 11 may be connected at its extremities to the main tank or boiler 12 of a high pressure system. Such connection is had in any convenient structural manner, such as by means of two continuous passages 13 and 14 at the top and bottom respectively of the boiler or tank 12. In order to reduce surges in the level of the boiler fluid within standpipe 11 there may be a series of baffles 15 located across the passage 14.

The connecting passages 13 and 14 may be constructed of any material having sufficient strength, and it is contemplated that the same material as the walls of the main tank or boiler 12 would be preferable. Standpipe 11 might also be constructed of the same high tensile strength material as the boiler 12 although it is to be noted that the material used for standpipe 11 must be one which is non-magnetic in nature. It is contemplated that a preferred material for the standpipe 11 might be a non-magnetic stainless steel.

Situated adjacent to the standpipe 11 and vertically spaced from one another, there is a series of magnetic material elements 20. Each of these elements 20 has the magnetic material path thereof situated so as to provide a gap across the standpipe 11 including at least part of the space within the standpipe. Consequently the presence of a magnetic material ball 21 may be detected when it is located adjacent one of the magnetic material elements, in a manner to be more fully set forth below.

Ball 21 may take various forms but is most conveniently constructed as a hollow sphere having at least some of its structure constructed of a high permeability magnetic material. It is contemplated that this ball may be plated or otherwise coated as necessary for protection from the boiler fluid employed. Furthermore, this hollow sphere or ball 21 may have a small quantity of liquid, e. g. water, on the inside thereof so that pressure may be built up from within, to equalize the exterior pressure on the ball and avoid the necessity for providing a very thick-walled sphere.

Referring to Fig. 2 it will be noted that the presence of the ball 21 within the gap of the magnetic material circuit of each element 20 will produce an output signal for determining this presence of the ball 21.

Various types of magnetometer circuits or arrangements may be employed in connection with elements 20. Some examples of certain magnetometers, the principles of which might be employed, are to be found in the patents to Barth Nos. 2,252,059, issued August 12, 1941 and 2,390,051 issued December 4, 1945 or a patent to Vacquier No. 2,407,202 issued September 3, 1946. However, it is preferred to employ a circuit such as that illustrated in Fig. 2.

In the particular magnetometer circuit illustrated in Fig. 2, each element 20 includes a magnetic material flux path 22 that has a gap between two extremities 23 and 24 of the path 22. These extremities 23 and 24 are situated directly in contact with the surface of the standpipe 11. The magnetic gap therefore crosses directly over the center of the space within standpipe 11, and will include the magnetic material ball 21 whenever it is floated within this gap.

In order to detect the presence of the ball 21 in an electromagnetic manner, i. e. without employing any moving parts adjacent to the standpipe 11, there is a means for generating a magnetic field that is uni-directional in nature. Such means might involve the use of a permanent magnet, but in the illustrated embodiment there is a coil 25 that may be connected to a D. C. source of energization as indicated by the plus and minus signs adjacent to a pair of terminals 26 and 27 for the two ends of the coil 25. It will be observed that coil 25 may be constructed of two parts which, in this instance, are connected together in series to form a single coil, in effect.

Situated on another portion of the flux path 22 there is a pair of coils 28 and 29. These coils 28 and 29 are wound in opposite directions around the flux path 22 and are connected into an electrical bridge circuit 30 that is energized by and includes two halves of a center-tapped secondary winding 31 having a center-tapped connection point 32. The electrical energization for the bridge network is derived from a convenient source of alternating current, as indicated by the symbol. This A. C. source will be connected to a pair of input terminals 33. Input terminals 33 are in turn connected to the ends of a primary winding 34 that is inductively related to secondary winding 31 which is part of the bridge network 30.

There is a common point 35 to which one end of each of the pair of coils 28 and 29 is connected, and which forms one of the output points for the bridge network 30. The output of the bridge 30 is thus transmitted via a primary winding 36 that has its ends connected to the points 35 and 32, and which is inductively situated relative to a secondary winding 37. Output signals from the bridge network 30 are thus transmitted from secondary winding 37 via an amplifier 38, if necessary, to a plurality of indicators 39 and 40 as illustrated.

If the output signals from the bridge network 30 are strong enough and the indicators 39 and 40 are sensitive enough, the amplifier 38 might be dispensed with. The details of the amplifier 38 are not material to this invention and any feasible amplifier may be employed, e. g. a magnetic amplifier might be used. The latter would eliminate possible failure of electronic elements which would be employed in an electronic amplifier.

The indicators 39 and 40 may take various forms and are illustrated as being step-by-step instruments having a pointer 41 that is pivoted at the center of a calibration dial 42, and will point toward the energized one of a series of coils 43. There is one coil 43 for each of the magnetometer elements 20 (see Fig. 1). The use of a plurality of indicators 39 and 40 is merely a matter of convenience and each indicator is identical with the others and connected in parallel therewith. It will be understood that a scanning arrangement (not shown) might be employed to sweep the outputs of the magnetometer pick-up elements 20 and indicate the one providing an output once each time a sweep is made.

Figs. 3 and 4 illustrate two embodiments or types of magnetometer pick-up elements 20. It will be observed that the Fig. 4 type of element is comparable to that illustated in Fig. 2 and the elements involved are indicated by corresponding reference numbers with primes thereon. Thus there is a magnetic material flux path 22' which has a gap between its extremities 23' and 24', so that the magnetic flux path crosses directly over the space within standpipe 11 as indicated in the drawing. There is included in Fig. 4 a shaded area 46 as part of the flux path 22' to illustrate the uni-directional magnetization of the flux path. It will be clear that sets of coils 47 and 48 may be connected in a circuit like that illustrated in Fig. 2, if desired.

In Fig. 3 there is shown an alternative construction for each of the magnetometer pick-up elements 20. This type involves the use of an E-type magnetic material flux path 49 which has a center leg 50 that ends in contact with, or closely adjacent to, the surface of the standpipe 11. Otherwise, magnetic path 49 is similar to path 22 and includes two extremities 51 and 52. These extremities 51 and 52 form with the center leg 50 a double gap arrangement for the magnetic flux path. In this instance the magnetic flux path is compound or may be considered as two flux paths (as indicated by the magnetic lines shown dotted in Fig. 3). There are two sets of coils 53 and 54 on the outside legs of the E-shaped flux path 49.

It will be noted that to obtain the flux pattern illustrated in Fig. 3, connection of the coils must be made differently from the connections shown in Fig. 2. In other words, this magnetic effect may be had by a permanent magnetization as indicated by the shaded showing on center leg 50, where north and south magnetic poles are indicated. Or, if this effect is to be had by electromagnetic energization of coils with direct current, it will be necessary to connect one of the coils 53 with one of the coils 54 on the other side of the flux path 49. Therefore, the remaining two coils of the pairs 53 and 54 will be available for connection in a circuit such as that illustrated in Fig. 2. In this arrangement the presence of the ball 21 within the compound or double gaps formed by the E-type magnetic material path 49 provides a low-reluctance path for passage of flux across both halves of the compound gap in the manner shown by the dotted line indication.

Operation

The operation of the magnetometer arrangement which has been disclosed in Fig. 2 will be described and in this manner it will become clear the manner in which the entire liquid level-measuring system illustrated in Fig. 1 operates. Each of the pick-up elements 20 is connected in its own electrical circuit for determining the presence of the ball 21 within the gap in the flux path thereof. Thus the identity of which element or elements 20 has or have the ball 20 adjacent thereto will determine where the ball is, and consequently, the level of the liquid floating the ball. Attention is directed to Fig. 2. Because the standpipe 11 is a non-magnetic material, so long as the magnetic ball 21 is not situated within the gap formed between extremities 23 and 24, the flux density within magnetic flux path 22 will be extremely low. Under this condition the circuit constants of the elements forming the electrical bridge network 30 are adjusted so that the bridge is in balance, and the output therefrom is zero.

Thus, no signal is transmitted via transformer windings 36 and 37 and the coil 43 that is connected to the output of secondary winding 37 will not be energized.

When the level of the fluid within boiler 12 changes so that the ball 21, floating on the surface of the connected column in pipe 11, changes position so that it comes within the gap between extremities 23 and 24, it will cause an increase in the flux density of the uni-directional flux passing through the magnetic path 22. This increase in the flux density, being uni-directional in nature, will add to the flux set up by one of the windings 28 or 29 during one half cycle of the A. C. energization thereof. Simultaneously the flux increase will subtract from the A. C. flux set up by the other of these windings during the same half cycle of the A. C. energization. This means that, whereas the impedance of each of the windings 28 and 29 was equal when the ball 21 was not present (since the inductive reactance was substantially the same because the D. C. flux density was negligible), the impedance will increase in one winding and simultaneously decrease in the other winding during each half cycle of the A. C. energization. Therefore, the effect on the electrical bridge network 30 will be to unbalance the same and provide an output signal at points 35 and 32, which will be transmitted via windings 36 and 37 to the amplifier 38. The signal is then transmitted via a pair of wires 55 and another pair of wires 56 to the coil 43 for energizing the same. It will be noted that there is a rectifier 57 included in one of the wires 56 in order to energize coil 43 with direct current. Now, the pointer 41 will swing to point toward coil 43. Coil 43 is situated adjacent to the dial 42 for indicating a predetermined level as determined by the position of the given magnetometer element 20 which is connected to this coil 43. It will be appreciated that there are as many coils 43 as there are elements 20 situated up and down standpipe 11 so that the fluid level indication will be step-by-step, and may be made as accurate as feasible, depending upon the space available and dimensions of the pick-up elements 20 as well as the size of the boiler itself.

It is pointed out that any number of indicators like indicators 39 and 40 might be employed, from one up to any number, as desired.

While there has been shown and described in considerable detail certain embodiments of the invention in accordance with the applicable statutes, this is not to be taken as in any way limiting the invention but merely as being descriptive thereof.

It is claimed:

1. In an electromagnetic fluid level-measuring system, means for determining a given level of the fluid comprising a magnetic material body floating on the surface of said fluid, non-magnetic material means for confining said body to a given path of travel as said fluid level changes, a substantially closed magnetic material circuit having a gap therein, said gap being located across said given path of travel, uni-directional magnetic field generating means for causing a magnetic flux to flow in said magnetic material circuit, and electric circuit means including at least one coil associated magnetically with said magnetic material circuit for determining the presence of said body within said gap at the given level of the fluid.

2. In an electromagnetic fluid level-measuring system, means for determining a given level of the fluid comprising a magnetic material body floating on the surface of said fluid, non-magnetic material means for confining said body to a given path of travel as said fluid level changes, a substantially closed magnetic material circuit having a gap therein, said gap being located across said given path of travel, uni-directional magnetic field generating means for causing a magnetic flux to flow in said magnetic material circuit, and electric circuit means including a pair of coils magnetically coupled to said magnetic material circuit for determining the presence of said body within said gap by reason of the change in flux density in said magnetic circuit caused thereby.

3. In an electromagnetic fluid level-measuring system, means for determining a given level of the fluid comprising a magnetic material body floating on the surface of said fluid, non-magnetic material means for confining said body to a given path of travel as said fluid level changes, a substantially closed magnetic material circuit having a gap therein, said gap being located across said given path of travel, uni-directional magnetic field generating means for causing a uni-directional magnetic flux to flow in said magnetic material circuit, and electric circuit means including a balanced bridge network having two coils in opposing relation therein, said two coils being magnetically coupled to said magnetic material circuit for causing the presence of said uni-directional flux to unbalance said bridge to provide a signal indicative of the presence of said body within said gap.

4. In an electromagnetic fluid level-measuring system, means for determining a given level of the fluid comprising a magnetic material body floating on the surface of said fluid, non-magnetic material means for confining said body to a given path of travel as said fluid level changes, a substantially closed magnetic material circuit having a gap therein, said gap being located across said given path of travel, unidirectional magnetic field generating means for causing a uni-directional magnetic flux to flow in said magnetic material circuit, electric circuit means including a balanced bridge network having two coils in opposing relation therein, said two coils being magnetically coupled to said magnetic material circuit for causing the presence of said uni-directional flux to unbalance said bridge to provide a signal indicative of the presence of said body within said gap, and means controlled by said signal for indicating the given liquid level.

5. A fluid level-measuring system for use with a high pressure boiler comprising an upright tube of non-magnetic material having its extremities connected to said boiler at the maximum and minimum levels of boiler fluid to be measured, a magnetically permeable body located within said tube and floating on said fluid, a plurality of electromagnetic elements vertically spaced apart and located adjacent the surface of said tube, each of said electromagnetic elements including a substantially closed magnetic flux path having a gap therein, said gap including at least part of the space within said tube, uni-directional magnetic field generating means for causing magnetic flux to flow in said flux path, and electric circuit means including at least one coil associated with each of said flux paths for determining the presence of said body in each of said gaps in turn, to indicate the level of said fluid by steps.

6. A fluid level-measuring system for use with a high pressure boiler comprising an upright tube of non-magnetic material having its extremities connected to said boiler at the maximum and minimum levels of boiler fluid to be measured, a magnetically permeable body located within said tube and floating on said fluid, a plurality of electromagnetic elements vertically spaced apart and located adjacent the surface of said tube, each of said electromagnetic elements including a magnetic material circuit including a gap therein lying across said tube to include at least part of the space within the tube therein, uni-directional magnetic field generating means for causing magnetic flux to flow in said magnetic material circuit, and electric circuit means including at least one coil magnetically coupled to each of said magnetic material circuits for determining the presence of said body in each of said gaps in turn to determine the level of said fluid by steps.

7. A fluid level-measuring system for use with a high pressure boiler comprising an upright tube of non-magnetic material having its extremities connected to said boiler at the maximum and minimum levels of boiler fluid to be measured, a magnetically permeable body located within said tube and floating on said fluid, a plurality of electromagnetic elements vertically spaced apart and located adjacent the surface of said tube, each of said electromagnetic elements including a magnetic material circuit including a gap therein lying across said tube to include at least part of the space within the tube therein, uni-directional magnetic field generating means for setting up a magnetic flux potential in said magnetic material circuit, electric circuit means including a pair of coils magnetically coupled to each of said magnetic material circuits for determining the presence of said body in each of said gaps in turn, and means connected to said electric circuit means for indicating the level of said fluid as determined by the presence of said body in said gaps.

8. A fluid level-measuring system for use with a high pressure boiler comprising an upright tube of non-magnetic material having its extremities connected to said boiler at the maximum and minimum levels of boiler fluid to be measured, a magnetically permeable body located within said tube and floating on said fluid, a plurality of electromagnetic elements vertically spaced apart and located adjacent the surface of said tube, each of said electromagnetic elements including a magnetic material circuit including a gap therein lying across said tube to include at least part of the space within the tube therein, uni-directional magnetic field generating means for setting up a magnetic flux potential in said magnetic material circuit, electric circuit means including a plurality of balanced bridge networks each having two coils in opposing relation therein, said two coils being magnetically coupled to one of said magnetic material circuits for causing the presence of the uni-directional flux as said body is in said gap to unbalance said bridge and provide a signal indicative of such presence, and means controlled by said signal for indicating the level of the fluid in steps.

References Cited in the file of this patent

UNITED STATES PATENTS

| 530,592 | Kleritj | Dec. 11, 1894 |
| 2,411,330 | Melas | Nov. 19, 1946 |

FOREIGN PATENTS

| 370,498 | Italy | Apr. 18, 1939 |